US009677633B2

United States Patent
Horner et al.

(10) Patent No.: US 9,677,633 B2
(45) Date of Patent: Jun. 13, 2017

(54) BRAKING AND INDEXING ASSEMBLY FOR ROTATING MEMBERS

(71) Applicant: DEERE & COMPANY, Moline, IL (US)

(72) Inventors: Jennifer R. Horner, Waukee, IA (US); Jacob D. Kappelman, Bloomfield, IA (US); Henry D. Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 507 days.

(21) Appl. No.: 14/452,317

(22) Filed: Aug. 5, 2014

(65) Prior Publication Data

US 2016/0037726 A1    Feb. 11, 2016

(51) Int. Cl.
*A01D 69/10*      (2006.01)
*F16D 65/58*      (2006.01)
*F16D 49/10*      (2006.01)
*A01F 15/07*      (2006.01)

(52) U.S. Cl.
CPC .......... *F16D 65/58* (2013.01); *A01F 15/0715* (2013.01); *F16D 49/10* (2013.01); *A01F 2015/072* (2013.01)

(58) Field of Classification Search
CPC ...... A01F 15/07; A01F 15/0715; F16D 49/10; F16D 65/58
USPC .... 53/64, 118, 508, 587; 56/11.3, 11.6, 341, 56/400.02
See application file for complete search history.

(56) References Cited

U.S. PATENT DOCUMENTS

| | | | | |
|---|---|---|---|---|
| 4,779,526 A | * | 10/1988 | Frerich | ............... A01F 15/0715 100/5 |
| 4,787,193 A | * | 11/1988 | Verhulst | ............. A01F 15/0715 53/118 |
| 4,956,960 A | | 9/1990 | Anstey et al. | |

(Continued)

FOREIGN PATENT DOCUMENTS

EP    1872648 A1    1/2008

OTHER PUBLICATIONS

European Patent Office, Extended European Search Report for European Patent Application No. 15177355.3-1656 mailed Dec. 4, 2015.

(Continued)

*Primary Examiner* — Christopher Schwartz
(74) *Attorney, Agent, or Firm* — Lorenz & Kopf, LLP

(57) ABSTRACT

An assembly is described for braking and indexing rotating components, including guide rollers of balers. A wheel is attached to a rotating component and is surrounded, at least in part, by a traction device. A tensioning assembly with a lost motion linkage is attached to the traction device and to a frame. A counterforce assembly is also attached to the traction device and to the frame. When a portion of the tensioning assembly is moved in a braking direction, the stop prevents further movement of the lost motion linkage to apply a tensioning force to the traction device. The tensioning force is resisted by the counterforce assembly to impose a braking force on the wheel and thereby brake the rotating component. Moving the portion of the tensioning assembly in a release direction moves the lost motion linkage away from the stop, thereby reducing the braking force on the wheel.

20 Claims, 9 Drawing Sheets

(56) References Cited

U.S. PATENT DOCUMENTS

| | | | |
|---|---|---|---|
| 5,152,123 A * | 10/1992 | Viaud | A01F 15/0715 100/4 |
| 5,692,366 A * | 12/1997 | Hardesty | A01D 34/69 180/19.3 |
| 6,164,050 A | 12/2000 | Vande Ryse et al. | |
| 6,622,463 B1 | 9/2003 | Anstey et al. | |
| 6,651,408 B1 | 11/2003 | McClure | |
| 7,918,069 B2 | 4/2011 | Viaud | |
| 8,490,366 B1 | 7/2013 | Hintz | |
| 9,560,808 B2 * | 2/2017 | Foster | A01F 15/0715 |

OTHER PUBLICATIONS

John Deere, Balers Brochure, Nov. 2013.

* cited by examiner

BRAKING AND INDEXING ASSEMBLY FOR ROTATING MEMBERS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to braking and indexing various rotating members, including driven rolls for wrapping baled material within round balers.

BACKGROUND OF THE DISCLOSURE

In various agricultural and other settings, rotating machinery may be utilized. For example, rotating components may be utilized in round (or other) balers for gathering cut material from a field, forming cylindrical (or other) bales of the material within a baling chamber, and wrapping the formed bales with various types of wrap material. In certain implementations, various rollers or other devices may rotate in order to form the material into the bales within the baling chamber. In certain implementations, additional rollers or other devices may then rotate to wrap the finished bales with various materials before the bales are ejected from the baling chamber. In various instances, it may be useful to brake or to index various of these rollers and devices, as well as various other rotating components.

SUMMARY OF THE DISCLOSURE

An assembly is disclosed for braking or indexing rotating members, including one or more rollers included in a baler.

According to one aspect of the disclosure, a wheel (or pulley) is attached to a rotating component and is surrounded, at least in part, by a traction device such as a brake belt. A tensioning assembly with a lost motion linkage is attached to one end of the traction device and to a frame of a work machine. A counterforce assembly is attached to another end of the traction device and to the frame. Rotating a portion of the tensioning assembly in a braking direction moves the lost motion linkage toward a stop for the lost motion linkage. The stop prevents further movement of the lost motion linkage with respect to the frame, such that the tensioning assembly applies a tensioning force to the traction device. The tensioning force is resisted by the counterforce assembly to impose a braking force on the wheel and thereby brake the rotating component. Rotating the portion of the tensioning assembly in the release direction moves the lost motion linkage away from the stop, thereby reducing the braking force on the wheel.

In certain embodiments, the counterforce assembly may include a mounted member or feed lever attached to the frame. A spring may extend between the mounted member or feed lever and the brake attachment point of the counterforce assembly. When a portion of the tensioning assembly is rotated in the braking direction the spring may provide a resistive force to the traction device to resist the tensioning force from the tensioning assembly. The spring may be pre-compressed when installed on the counterforce assembly, such that the resistive force provided by the spring to the traction device remains relatively constant over a lifespan of the traction device.

In certain embodiments, a feed lever included in the counterforce assembly may be rotated in an indexing direction to apply a tensioning force to the traction device, which may be resisted by a spring of the tensioning assembly to impose an indexing force on the wheel. Rotating the feed lever in a reset direction may release this tensioning force to remove the indexing force from the wheel. In certain embodiments a catch may be attached to the frame. A spring in the counterforce assembly may urge the feed lever against the catch when the counterforce assembly is in a braking orientation. Accordingly, the catch may prevent rotation of the feed lever in the reset direction, to allow the counterforce assembly to resist tensioning force applied to the traction device by the tensioning assembly.

In certain embodiments, a power source may automatically provide drive force to the wheel depending on the rotation of the tensioning assembly. In certain embodiments, a controller may determine a state of an operation including the rotating component and may automatically cause an actuation device to rotate the portion of the tensioning assembly depending on the determined state.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
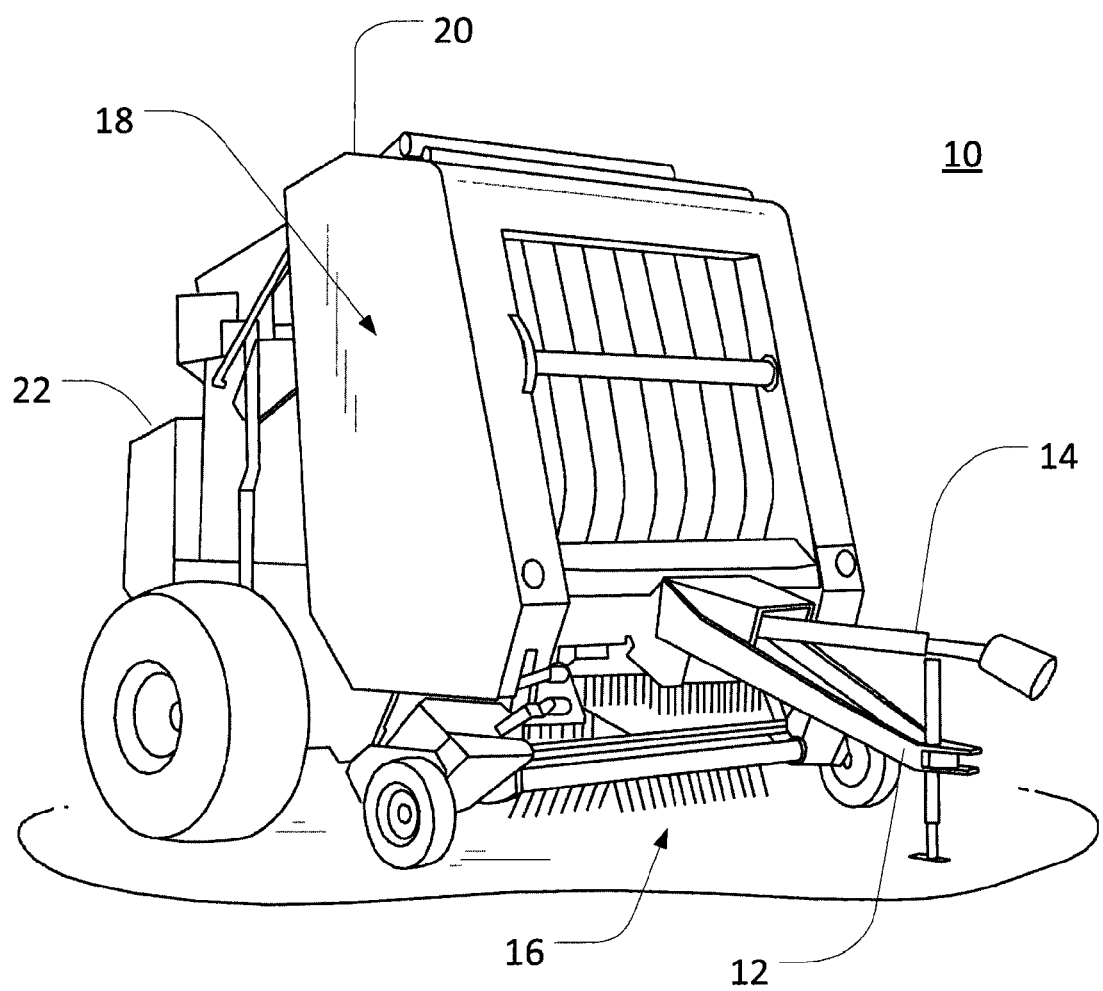
FIG. 1 is a perspective view of an example baler configured for towing by an agricultural work vehicle.

The following describes one or more example embodiments of the disclosed indexing and braking assembly (or assemblies), as shown in the accompanying figures of the drawings described briefly above. Various examples herein may refer to assemblies in the context of a round baler for cut plant material and to the braking and indexing of a guide roll of such a baler. It will be understood, however, that the disclosed assemblies may be utilized in a variety of settings, with respect to a variety of machinery, and for a variety of rotating components. It will also be understood that, while terms such as "upper," "lower," "clockwise," "counterclockwise" and the like may be utilized below with respect to an orientation or operation depicted in a particular figure, such terms may be used in a relative sense and are not intended to limit the disclosure to the particular orientation or operation described. Various modifications to the example embodiments may be contemplated by one of skill in the art.

As noted above, it may be useful in various circumstances to gather loose material, such as cut crop material, into compacted bales. In certain embodiments, such material may be gathered and compacted into generally cylindrical bales. This may be accomplished by way of various types of round balers. For example, in certain round balers, cut crop (or other) material may be gathered from windrows along a field and may be passed into a baling chamber. A system of belts may rotate and compress the gathered material within the baling chamber in order to form the material into cylindrical bales of various size and density, depending on the configuration of the baler. In certain embodiments, once a bale of appropriate size has been formed, and before the bale is ejected from the baling chamber, wrapping material (e.g., net wrap) may be applied to the bale. For example, various rollers may guide net wrap from a material (i.e., source) roller onto the exterior of a rotating cylindrical bale in order to wrap the entire circumference of the cylinder with the net wrap. Once the bale has been appropriately wrapped, a cutting assembly may then sever the net wrap so that the wrapped bale may be ejected from the baling chamber and the process begun anew.

In this and other operations involving rotating components, it may be useful to provide a system (or systems) for braking and indexing those components. For example, in the context described above, in which a guide roller (e.g., a rubber guide roller) assists in guiding wrapping material from a source of the material (e.g., a material roll) to the exterior of the bale, it may be useful to provide a system for braking the guide roller at the end of a wrapping operation. Further, it may be useful to selectively rotate (i.e., index) the guide roller when providing a new roll of wrap material (or in other circumstances) in order to guide the material from the material roll into an appropriate preliminary orientation within the wrapping system. Accordingly, for example, it may be useful to provide a system for indexing the guide roller. In certain embodiments, these systems may be combined into a single braking and indexing system, which may interoperate with various other components and systems of the relevant baler (or other machinery).

In certain embodiments, a baler may include a guide roller for wrapping material (or another rotating component) that is driven by a power source such as an electric motor, a connection to a power take-off ("PTO") shaft, and so on. A guide roller may be, for example, a rubber (or rubber-coated) roller that guides wrapping material (e.g., net wrap) toward the baling chamber for a wrapping operation as driven by an electrical motor or a mechanical link to a PTO connection (e.g., a geared connection with an intervening clutch assembly). In certain embodiments, in addition (or as an alternative) to guiding wrapping material a guide roller may engage with a material roll (e.g., a roll of net wrap) in order to rotate the material roll. For example, a spring-loaded guide roller may press against the wrap material on a material roll and, via the friction provided by this contact, cause the material roll to counter-rotate with the guide roller. In this way, the driven guide roller may cause wrapping material to be unwound from the material roll and fed into a wrapping system.

In certain embodiments, one end of a guide roller (or other component) may include a wheel, such as a pulley or sheave. In certain embodiments, such a wheel may include a connection for driving the guide roller. For example, the wheel may include a pulley configured to engage a drive belt that extends between the pulley and a separate, driven pulley.

A brake band or other traction device may partially surround such a wheel and may be attached at one end to a tensioning assembly and at another end to a counterforce assembly. In certain embodiments, accordingly, rotation of the tensioning assembly (or a portion thereof) around an attachment point on the baler frame may cause an increase in tension on the brake band (or other traction device), which may be resisted by the counterforce assembly. For example, rotation of the tensioning assembly in a braking direction may cause a spring-loaded, lost-motion linkage in the tensioning assembly to be urged into a stop that limits further motion of the linkage. Accordingly, the tensioning assembly may impose a tensioning force on the traction device. This tensioning force may be resisted by the counterforce assembly (which may also, in certain embodiments, be spring-loaded), such that a braking force is applied by the traction device to the wheel.

In this way, by rotating the tensioning assembly in an appropriate direction and to an appropriate degree, the traction device may be caused to stop rotation of the wheel and, accordingly, of the guide roller. This may be useful, for example, once a wrapping operation for a particular bale has finished. For example, where a guide roller is both driving rotation of a material roll and guiding wrap material into a wrapping system, when a bale has been fully wrapped, braking the guide roller may substantially simultaneously stop rotation of the material roll and cease the feeding of additional wrap material into the system. In certain embodiments, such braking may also correspond to a severing of the wrap material. For example, the tensioning assembly may be linked to a counterknife such that rotation of the tensioning assembly to brake the guide roller corresponds to a severing of the wrap material with the counterknife.

Rotation of the counterforce assembly (or a portion thereof) may also cause an increase in tension on the traction device, which may be resisted by the tensioning assembly. For example, a counterforce assembly (which may be spring-loaded) may be rotated in an indexing direction in order to apply a tensioning force to the traction device. This tensioning force may be resisted by the tensioning assembly (e.g., by a spring attached to a lost motion linkage of the tensioning assembly), such that an indexing force is applied to the wheel and to the guide roller. When the counterforce assembly is then rotated in an opposite direction, this indexing force may be released and the collective system may be ready for additional indexing operations. In this way, through cyclical rotation and counter-rotation of the counterforce assembly (which may also, in such a case be viewed as an indexing assembly), the guide roll may be successively advanced by finite rotational amounts. This may be useful, for example, in order to feed wrap material past the guide roller and into the wrapping system when a new material roll has been added to the baler.

In certain embodiments, both types of functionality described above (i.e., braking and indexing functionality) may be available provided by a system including both a tensioning and a counterforce (or indexing) assembly. In certain embodiments, only one type of functionality may be provided. For example, if a counterforce assembly is non-movably fixed to a baler frame, the counterforce assembly may facilitate a braking operation by resisting a tensioning force applied to a traction device by a tensioning assembly. However, such a counterforce assembly may not necessarily facilitate indexing of the guide roller, because the counterforce assembly—or appropriate components thereof—may not be appropriately movable. Likewise, if a tensioning assembly is non-movably fixed to a baler frame, the tensioning assembly may facilitate an indexing operation by resisting a tensioning force applied to a brake (or indexing) device. For example, a spring included in the tensioning assembly may resist tensioning force applied by a counterforce (or other) assembly to index a rotating component. However, such a tensioning assembly may not necessarily facilitate braking of the guide roller, because the tensioning assembly—or appropriate components thereof—may not be appropriately movable.

In certain embodiments, a tensioning assembly may include a pivoting member rotatably attached to a frame of a baler, and a spring-loaded linkage (e.g., a spring-loaded, lost-motion linkage) attached to the pivoting member. The linkage may be engaged with one end of a traction device (e.g., a brake band) surrounding a pulley member that is attached to (and rotates with) a guide roller. A counterforce assembly may include a mounted member attached to the baler frame, with, in certain embodiments, a spring extending between the mounted member and another end of the traction device. In this way, rotating the pivoting member of the tensioning assembly in one direction may tension the spring in the spring-loaded linkage in order to impose a tensioning force on the traction device. This tensioning force may be resisted by the mounted member of the counterforce assembly (e.g., as the lost motion linkage is urged into a stop to prevent further motion of the linkage), such that a braking force is applied to the guide roller via the pulley member. This braking force may then be reduced (and released) by rotating the pivoting member in the opposite direction, which may release the lost motion linkage from the stop and thereby reduce the tensioning force on the traction device.

In certain embodiments, the rotation of the pivoting member may occur automatically based on detection or occurrence of certain events or conditions. For example, a controller may monitor a wrapping operation for the baler and determine when a bale has been appropriately wrapped. Upon such a determination, the controller may automatically cause an actuator to rotate the pivoting member in order to brake the guide roller. In this way, the guide roller may be prevented from continuing to direct wrap material toward the baling chamber when the material is not needed (e.g., when a bale within the chamber has already been appropriately wrapped).

In certain embodiments, the pivoting member may form part of an assembly with additional functionality, which may also be controlled by an actuator as noted above. For example, the pivoting member may include a counterknife arm supporting a counterknife. In such a case, upon the controller determining that a wrapping operation has completed, the actuator may rotate the counterknife arm in order to both brake the guide roller and cut the wrap material with the counterknife. In this way, not only may the guide roller be stopped from feeding additional wrap material toward the baling chamber, but the wrap material may be appropriately cut in order to allow the now-wrapped bale in the baling chamber to be ejected from the baler.

Continuing, in certain embodiments, the counterforce assembly may include a mounted member configured as a pivoting feed lever. During a braking operation, a catch on the baler frame may hold the feed lever in place to allow the counterforce assembly (e.g., via an included spring) to resist the tensioning force provided by the tensioning assembly to the traction device and thereby to assist in braking the guide roller. During an indexing operation, however, the feed lever may be removed from the catch in order to allow rotation of the feed lever in the indexing direction. As noted above, this may apply an indexing force to the traction device, which may be resisted by the tensioning assembly (or counterforce assembly) in order to index the pulley member (and the guide roller). As also noted above, this indexing rotation may then be alternated with rotation of the feed lever in a reset direction, which may remove the indexing force from the traction device and move the feed lever back to an appropriate location from which to begin another indexing rotation. Once the guide roller has been appropriately indexed (e.g., once a leading edge of a sheet of wrap material from a new material roll has been fed past the guide roller), the feed lever may be returned to the catch in order to allow for subsequent braking of the guide roller.

Other features and functionality may also be included. For example, a belt-tensioning device (e.g., an idler pulley) may be included on the tensioning assembly. In this way, rotating the tensioning assembly to release the braking force from the pulley member may cause the belt-tensioning device to engage a drive belt for the pulley member and thereby allow rotational force to be transmitted to the pulley member (e.g., from a motor or mechanical drive also associated with the drive belt). Further, when the tensioning assembly is rotated to apply the braking force, this may disengage the belt-tensioning device from the drive belt and thereby remove the rotational drive force from the pulley member. This may assist in more effective and efficient braking of the pulley member (and the guide roller).

As another example, a controller (e.g., a computational system, a mechanical controller, an electro-mechanical or electro-hydraulic controller, and so on) may be configured to cause a power source to provide power to the pulley member when the tensioning assembly is not engaged in braking the pulley member, and to not provide power to the pulley member when the tensioning assembly is engaged in braking the pulley member. For example, when the tensioning assembly is rotated to engage in braking the pulley member, the controller may cause an electric motor to turn off or may cause a transmission element (e.g., a clutch) to disengage, thereby depriving the pulley member of motive power. In contrast, when the tensioning assembly is rotated to release the braking force on the pulley member, the controller may cause the motor to turn on or may cause the transmission element to re-engage, thereby returning motive power to the pulley member.

Referring now to FIG. 1, a braking and indexing assembly (or assemblies) may be implemented with respect to round baler 10 (or with respect to a variety of other machines with rotating components). Baler 10 may include tongue 12 so that baler 10 may be towed during operation by a separate vehicle (e.g., an agricultural work vehicle such as a tractor (not shown)). Baler 10, in certain embodiments, may receive power from such a vehicle via PTO connection 14, which may be connected in various known ways to a PTO shaft of the vehicle. As baler 10 moves (e.g., is towed) across a field, cut crop material may be gathered by intake assembly 16 and guided into baling chamber 18 within frame 20. (As used herein, "frame" may include a chassis of baler 10, various support and safety structures, various interior or exterior panels, and so on.) Within chamber 18, various belts (not shown) or other devices may rotate and compress the gathered material into a generally cylindrical bale (not shown). Once the bale has reached an appropriate size, the bale may be wrapped (e.g., using various equipment protected by rear cover 22) and then ejected from baler 10.

Figure 2:
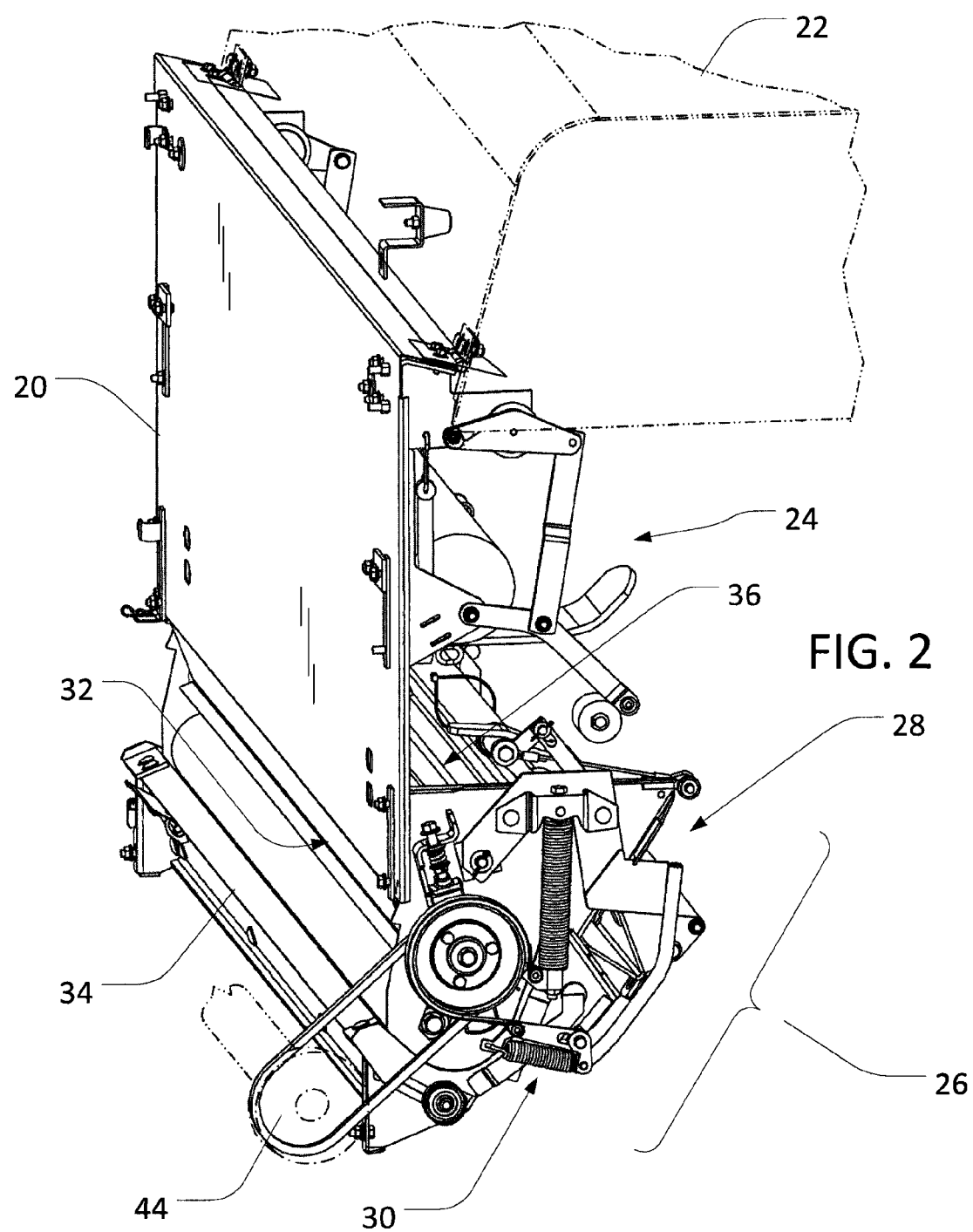
FIG. 2 is a perspective view of certain components of the baler of FIG. 1, with a rear cover of the baler being opened.

Referring also to FIG. 2, cover 22 may open to reveal compartment 24. (Compartment 24 is depicted in FIG. 2 as a rear compartment. It will be understood, however, that other locations of compartment 24 and the associated components depicted in FIG. 2 may be possible.) Compartment 24 may include various components of a wrapping system, such as material roll 36, and guide roller 32. Material roll 36, for example, may be a roll of wrapping material, such as net wrap material. Material roll 36 may be rotated by guide roller 32, which may in turn be driven by a power source such as an electric motor (not shown in FIG. 2) or a mechanical or other connection (not shown in FIG. 2) to PTO connection 14. In this way, wrapping material may be unwound from material roll 36 and guided by guide roller 32 between roll 36 and roller 32 toward additional components (not shown) of the wrapping system. In certain embodiments, braking and indexing assembly 26, which may include counterforce assembly 28 and tensioning assembly 30, may be mounted to frame 20 to the side of compartment 24, in order to allow for selective braking or indexing of guide roller 32. (As noted above, a similar assembly may be utilized with regard to various other rotating components for baler 10 or for other platforms.)

Figure 3:
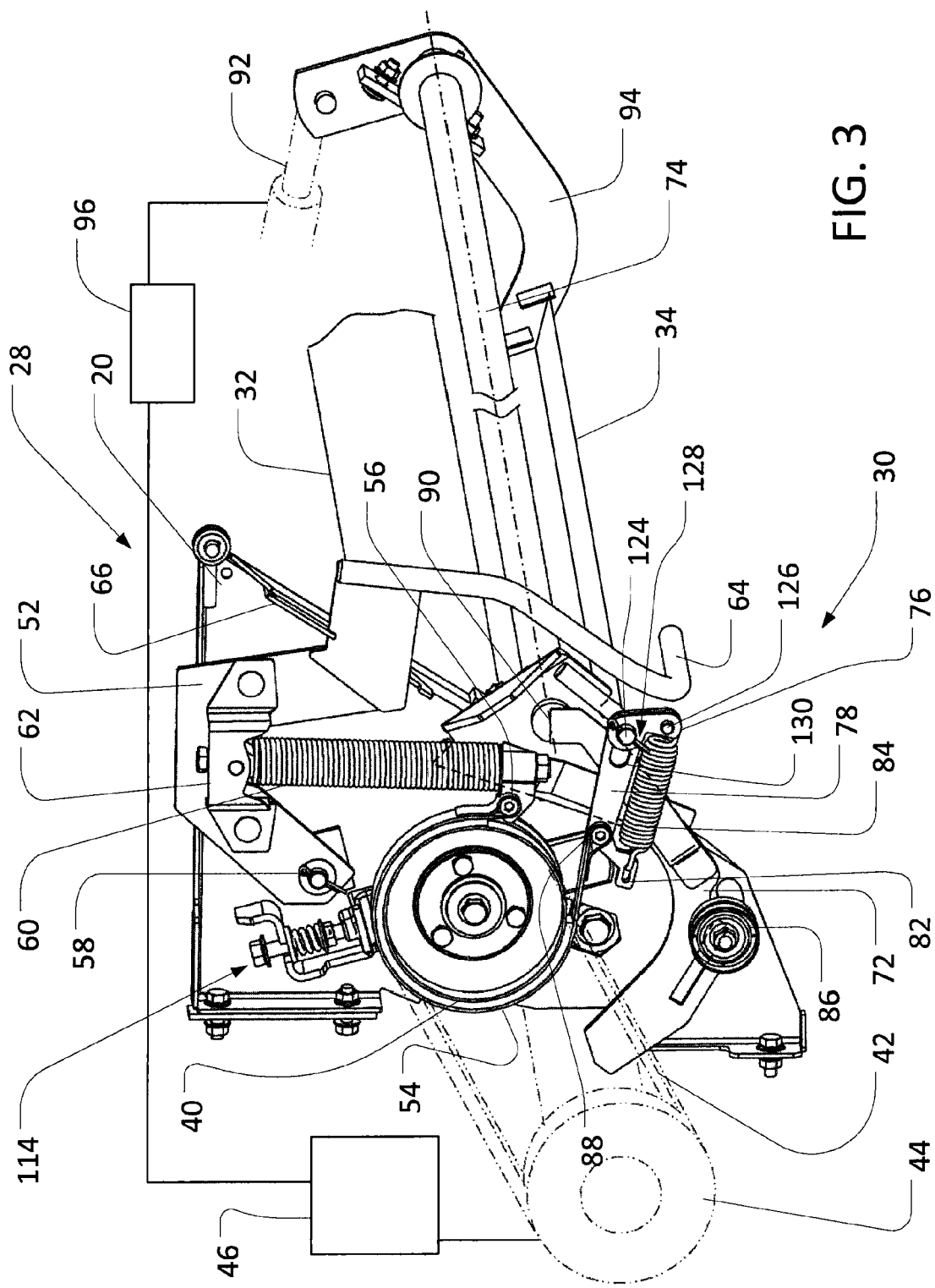
FIG. 3 is a perspective view of an example braking and indexing assembly for the baler of FIG. 1.

Referring also to FIG. 3, pulley member 40 (or a differently configured wheel) may be attached to guide roller 32 such that pulley member 40 co-rotates with guide roller 32. Pulley member 40 may be driven via drive belt 42, which may partially surround both of pulley member 40 and drive pulley 44. Drive pulley 44, in turn, may be driven by power source 46, which may include an electrical motor, a gearbox and clutch or other link to PTO connection 14, and so on. In this way, for example, guide roller 32 may be powered by power source 46 (e.g., an electric motor or mechanical transmission) via drive pulley 44, drive belt 42, and pulley member 40.

Counterforce assembly 28, which may assist in braking or indexing pulley member 40 (and guide roller 32), may be attached to brake belt 54 (or another traction device) at brake attachment point 56. Counterforce assembly 28 may also include a mounted member attached to frame 20 at frame attachment point 58. In certain embodiments, such a mounted member may be non-movably attached to frame 20 and, as such, provide a fixed anchor for various operations. In certain embodiments, and as depicted in FIG. 3, such a mounted member may be configured as feed lever 52, which may be rotatably mounted to frame 20 at attachment point 58 (e.g., via a bolt and cotter-pin connection). Where attachment point 58 is a rotatable attachment point, an additional attachment may be provided between frame 20 and feed lever 52, such that feed lever 52 may be prevented from rotating as appropriate (and so that feed lever 52 may thereby sometimes provide a relatively fixed anchor for various operations). For example, catch 66 (see also FIG. 4B) may be provided to prevent upward movement of feed lever 52 (from the perspective of FIG. 3) when feed lever 52 is engaged with catch 66.

In certain embodiments, spring 60 may be compressed between feed lever 52 (or a differently configured mounted member) and attachment point 56. (Various springs are depicted in the figures as coil springs. It will be understood, however, that this is not intended as a limitation of the disclosure and that a "spring" may include a variety of appropriately elastic components.)

In certain embodiments, spring 60 may be a spring with a relatively low spring rate, such that the force required to compress the spring a given distance may be relatively low. In certain embodiments, as discussed in greater detail below, spring 60 may be pre-compressed for installation on counterforce assembly 28. This may result in spring 60 applying a relatively large initial force to brake belt 54 at brake attachment point 56. Further, where the spring rate of spring 60 is relatively low, further compression of spring 60 during operation of counterforce assembly 28 may change the force applied by spring 60 at the brake attachment point 56 only by relatively small amounts. Accordingly, spring 60 may apply substantially constant force (e.g., force varying from an initial amount by 15% or less) at attachment point 56 even as the relative compression of spring 60 changes. This may be useful, for example, where a brake pad or other lining of brake belt 54 wears away during the lifespan of brake belt 54, which may require adjustments of spring 60 to maintain appropriate tension on brake belt 54.

Tensioning assembly 30, which may additionally (or alternatively) assist in braking or indexing pulley member 40 (and guide roller 32), may be attached to brake belt 54 (or another traction device) at brake attachment point 88. Tensioning assembly 30 may also include a pivoting member that may be rotatably mounted to frame 20 at frame attachment point 90. (In certain embodiments, a non-pivoting member may alternatively (or additionally) be provided, as described in greater detail below.) In certain embodiments, and as depicted in FIG. 3, such a pivoting member may be configured as counterknife arm 72 for baler 10. In such a case, for example, support member 74 (e.g., a torsion rod) and counterknife 34 may extend between counterknife arm 72 and counterknife arm 94. In this way, rotation of support member 74 (e.g., via activation of actuation device 92 (e.g., a hydraulic piston) to rotate counterknife arm 94) may cause counterknife arm 72 to pivot around attachment point 90.

A spring-loaded linkage may be attached to counterknife arm 72 (or a differently configured pivoting member) and to brake belt (or another traction device) at brake attachment point 88. As depicted in FIG. 3, such a linkage may be a lost motion linkage. For example, fixed linkage member 76 may be fixed with respect to counterknife arm 72, with a connection component (e.g., pin 124) extending into slot 130 in movable linkage member 78. In certain embodiments, linkage member 78 may include brake attachment point 88. Spring 78 may extend from a connection component (e.g., pin 126) of member 76 to spring-mount member 82, which may also be connected to attachment point 88.

Pin 124 may slide along slot 130 as linkage member 78 moves in order to guide the motion of linkage member 78. Further, when oriented by motion of linkage member 78 at an end of slot 130, pin 124 may provide a stop to prevent further movement of linkage member 78 in a particular direction. Generally, a "stop" of a lost motion linkage may be an orientation of the lost motion linkage (or components thereof) at which further motion of a lost motion portion of the linkage is prevented. It will be understood that various types of stops for a lost motion linkage may be possible, including stops provided by pins and slots (as described above), stops provided by chains or cables, and stops with other configurations.

It will be understood that various members of the linkage may be formed separately or as integral pieces. For example, fixed linkage member 76 may be integrally or separately formed with its various connection components, and spring-mount member 82 may be integrally or separately formed with moveable linkage member 78.

In certain embodiments, various other components may also be provided. For example, idler pulley 86 may be attached to counterknife arm 72 for controllable engagement of drive belt 42. Further, controller 96 may be provided, which may be in control communication with actuator 92 (e.g., a hydraulic piston or electric actuator), power source 46, and various other components or systems. For example, controller 96 may be configured to include a computerized, electrical, electrohydraulic or other controller, which may provide an electrical, hydraulic or other signal to actuation device 92 in order to cause device 92 to rotate counterknife 94. Likewise, controller 96 may be configured to cause power source 46 to provide (or not provide) power to drive pulley 44. For example, controller 96 (e.g., including a computerized, electronic, electrohydraulic, or other controller) may be configured to activate (or deactivate) an electric motor, engage (or disengage) a clutch device, and so on, such that rotational power is provided to drive pulley 44. In certain embodiments, bearing mount tensioning assembly 114 may be included to provide appropriate biasing force against guide roller 32.

Figure 4:
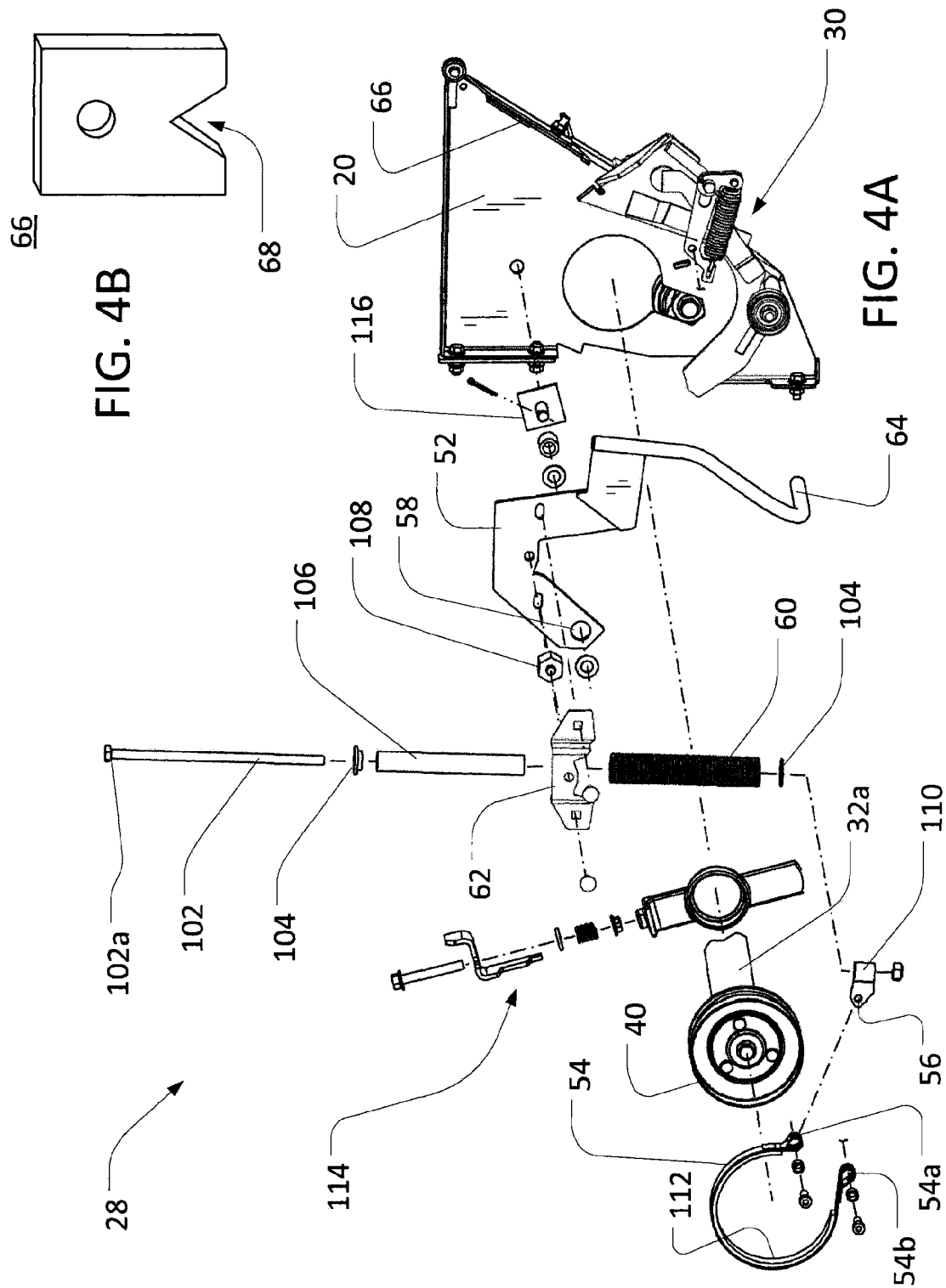
FIG. 4A is an exploded view of certain components of the example assembly of FIG. 3.
FIG. 4B is a perspective view of an example catch included in the example assembly of FIG. 3.

Referring also to FIGS. 4A and 4B, various example components of counterforce assembly 28 are depicted in an exploded view. As can be seen in FIG. 4A, when spring 60 is included in assembly 28 (e.g., as secured to feed lever 52 by bracket 62), the resting compressive force on spring 60 may be adjustable. For example, spring 60 may be aligned by spring guide 106 between two spring seats 104. Spring adjuster 102 (e.g., a partially threaded rod) may extend through spring 60 and trunnion 108, with trunnion 108 rotating with respect to bracket 62 to facilitate rotation of feed lever 52 about attachment point 58. In certain embodiments, spring adjuster 102 may accordingly be utilized to change the compression of spring 60 between spring seats 104 (e.g., by rotating a threaded adjuster 102 in either direction in order to adjust the distance between spring seats 104). During operation of counterforce assembly 28, nut 102a (or a similar feature) of spring adjuster 102 may seat on trunnion 108 to prevent extension of spring 60.

In certain embodiments, spring 60 may have a larger spring constant than spring 84, such that when spring 60 applies a tensioning force to brake belt 54, spring 84 may tend to elongate more than spring 60 tends to compress. Accordingly, applying tensioning force to brake belt 54 with spring 60 may cause pin 124 to be moved within slot 130 to a stop at the rightmost end (from the perspective of the figures) of slot 130. Similarly, when tensioning assembly 30 applies a tensioning force to brake belt 54 via spring 84, spring 84 may tend to elongate more than spring 60 tends to compress. This may also result in pin 124 moving to the rightmost end of slot 130 and the corresponding stop.

In certain embodiments, spring adjuster 102 may be utilized to pre-compress spring 60 by a particular amount prior to operation of counterforce assembly 28 (e.g., during installation of counterforce assembly 28). During operation of counterforce assembly 28, spring 60 may accordingly provide a larger initial tensioning force to brake belt 54 than if spring 60 had not been pre-compressed.

In certain embodiments, spring 60 may be pre-compressed (or otherwise configured) such that the initial tensioning force applied by spring 60 to brake belt 54 exceeds the maximum tensioning force that spring 84 (as configured with tensioning assembly 30) may apply to brake belt 54. Accordingly, movement of attachment point 56 by counterforce assembly 28 to increase tension on brake belt 54 may result in relatively substantial elongation of spring 84, but little or no compression of spring 60. Similarly, movement of tensioning assembly 30 to apply tensioning force to brake belt 54 may result in compression of spring 60 only after the lost motion linkage has reached a stop (e.g., after spring 84 has been elongated such that pin 124 seats against the right end of slot 130).

Various known techniques and configurations may be utilized to attach the various components of assembly 28 to frame 20 (or otherwise) in various fixed, rotatable, or other arrangements. For example, feed lever 52 may be rotatably attached to frame 20 at attachment point 58 via pivot plate 116, with plate 116 being fixed (e.g., welded) to frame 20 to provide a pivot point for the rotation of feed lever 52. In certain embodiments, pulley member may be fixedly attached to guide roller 32 via guide roller extension 32a, which may extend through frame 20 and bearing mount tensioning assembly 114 (which may be welded to the frame 20). Assembly 28 may be attached to brake belt 54 via loop 54a, which may be secured via a bolt or pin to mounting cap 110, on which lower spring seat 104 may be seated and through which spring adjuster 102 may pass to engage a nut or other attachment device.

In certain embodiments, brake belt 54 (or another traction device) may include brake pad 112 or various other features. Brake pad 112 may be configured, for example, to seat within a complimentary contour around the circumference of pulley member 40. During the limited lifespan of brake belt 54, brake pad 112 may tend to wear away. Accordingly, larger and larger displacement of attachment points 56 and 88 (from a reference position) may be required to apply the same braking force to the pulley member 40. In this regard, as also noted above, it may be useful for spring 60 to exhibit a relatively small spring rate. Where spring 60 exhibits a relatively small spring rate, the length of spring 60 (and, thereby, the location of attachment point 56) may be adjusted as brake pad 112 wears, without substantially changing the tensioning force applied by spring 60 to brake belt 54. When configured with a relatively small spring rate, spring 60 may accordingly provide a force to brake belt 54 that remains substantially constant over the lifespan of brake belt 54 (or another traction device).

As also noted above, in certain embodiments, a mounted member of assembly 28 may be configured as a rotatable feed lever (e.g., feed lever 52). As such, a catch may be provided on frame 20 to selectively prevent rotation of such a feed lever. In certain embodiments, such a catch may be configured as catch 66, which may include notch 68, which may prevent counter-clockwise rotation (from the perspective of FIG. 4A) of feed lever 52 when feed lever 52 is engaged with notch 68. In the configuration depicted, for example, spring 60 may tend to press against attachment point 56 to bias feed lever 52 upward into notch 68 such that spring 60 must be actively compressed (e.g., by clockwise rotation of feed lever 52) in order to remove feed lever 52 from notch 68.

Figure 5:
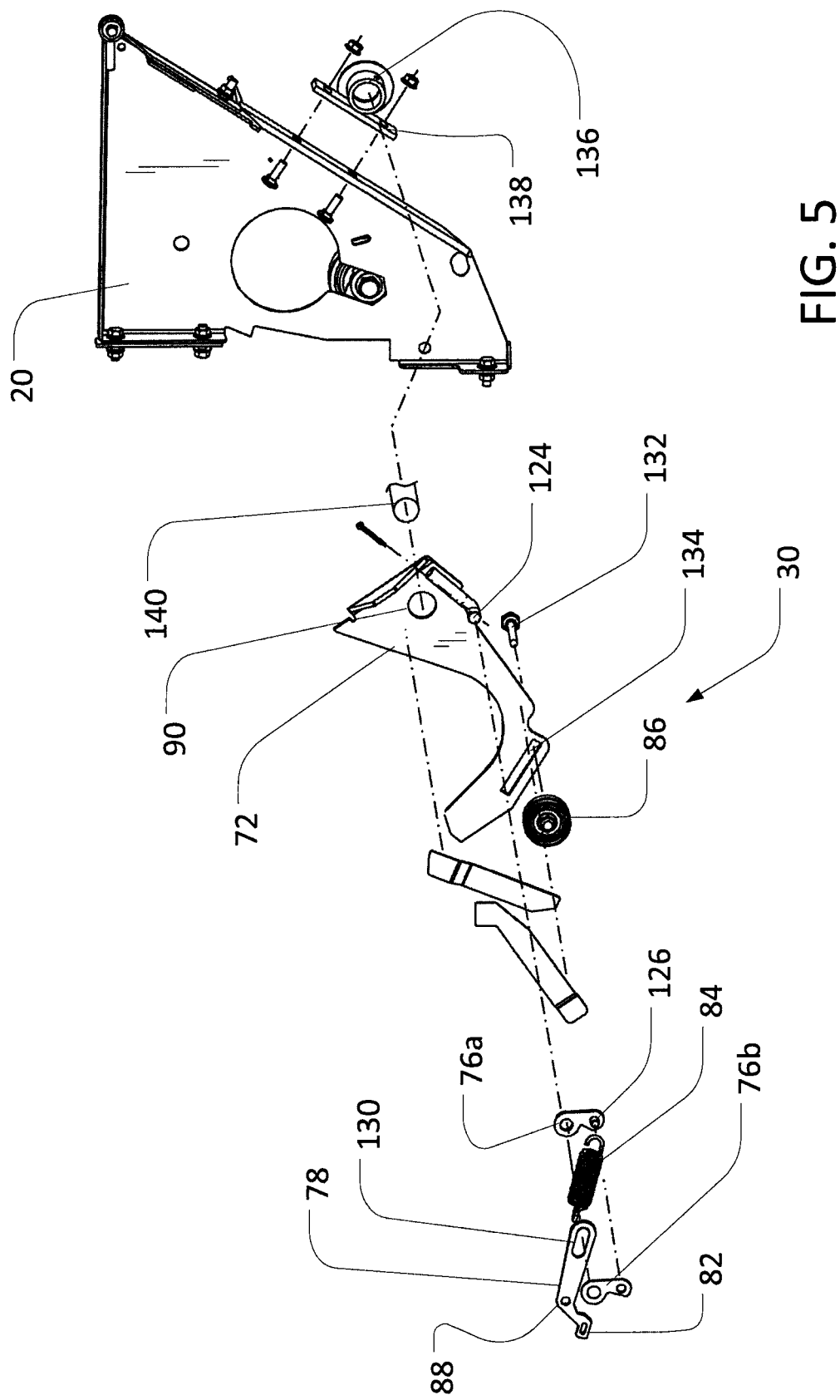
FIG. 5 is another exploded view of certain components of the example assembly of FIG. 3.

Referring also to FIG. 5, various example components of tensioning assembly 30 are depicted in an exploded view. As noted above, assembly 30 may include, in certain embodiments, a lost-motion linkage with fixed linkage member 76, movable linkage member 78 with slot 130, spring-mount member 82, spring 84, and so on. Generally, one end of spring 84 may be engaged with fixed linkage member 76 and the other end of spring 84 may be engaged with spring-mount member 82, in order to provide a spring-loaded connection between these components. One end of movable linkage member 78 may be attached to (and, in certain embodiments, include) spring-mount member 82, and may also include brake attachment point 88 (e.g., a hole through which a bolt or pin may be inserted to attach loop 54b of brake belt 54 (see FIG. also 4A)). Slot 130 (or another feature) at an opposite end of movable linkage member 78 may be slidably (or otherwise) engaged with fixed linkage member 76 in order to provide lost-motion functionality for the linkage.

In certain embodiments, various of these components may be formed integrally with other of the components, or may be formed as various distinct pieces. For example, as depicted in the various figures, spring-mount member 82 may be integrally formed with movable linkage member 78. Likewise, in certain embodiments, fixed linkage member 76 may include various separate components. For example, main member 76a may include lower pin 126 (or other connection component) to engage one end of spring 84, and may also include an upper opening, into which pin 124 (or other connection component) may be inserted to engage with slot 130 of movable linkage member 78. Main member 76a, lower pin 126, and pin 124 may be welded together, or otherwise rigidly connected. Member 76b may be configured to slide over the pins 124 and 126, in order to secure spring 84 and linkage member 78 in place. Member 76b may itself be secured in place with cotter pin arrangement 128 (see FIG. 3), or other mechanisms.

In certain embodiments, pin 124 (or various other components) may be fixedly attached to counterknife arm 72 (or another pivoting portion of assembly 30) in order to generally secure the linkage to counterknife 72. In this way, for example, movement (e.g., rotation) of counterknife arm 72 may generally correspond to movement of the associated linkage, with, for example, some of such movement being absorbed through lost-motion functionality provided by the components noted above.

Various other features may also be included. In certain embodiments, slot 134 may be included in counterknife arm 72 in order to allow idler pulley 86 to be adjustably attached to counterknife arm 72 (e.g., via bolt 132). This may, for example, allow for appropriate tensioning of drive belt 42 depending on the particular orientation (i.e., degree of rotation) of counterknife arm 72. For example, with idler pulley 86 appropriately located along slot 134, idler pulley 86 may tension drive belt 42 for power transmission substantially simultaneously with release of tension from brake belt 54 (as described in greater detail below). Similarly, with idler pulley 86 appropriately located, idler pulley 86 may release tension on drive belt 42 to prevent further power transmission by belt 42 substantially simultaneously with the application of braking tension to brake belt 54 (as also described in greater detail below). It will be understood that other timings for these events may also be possible, including non-simultaneous timings.

As with assembly 28, various known techniques and configurations may be utilized to attach the various components of assembly 30 to frame 20 or counterknife arm 72 (or otherwise) in various fixed, rotatable, or other arrangements. For example, bushing 136 may be secured to frame 20 via bushing mount 138, with extension 140 of support member 74 extending therethrough.

Figure 6:
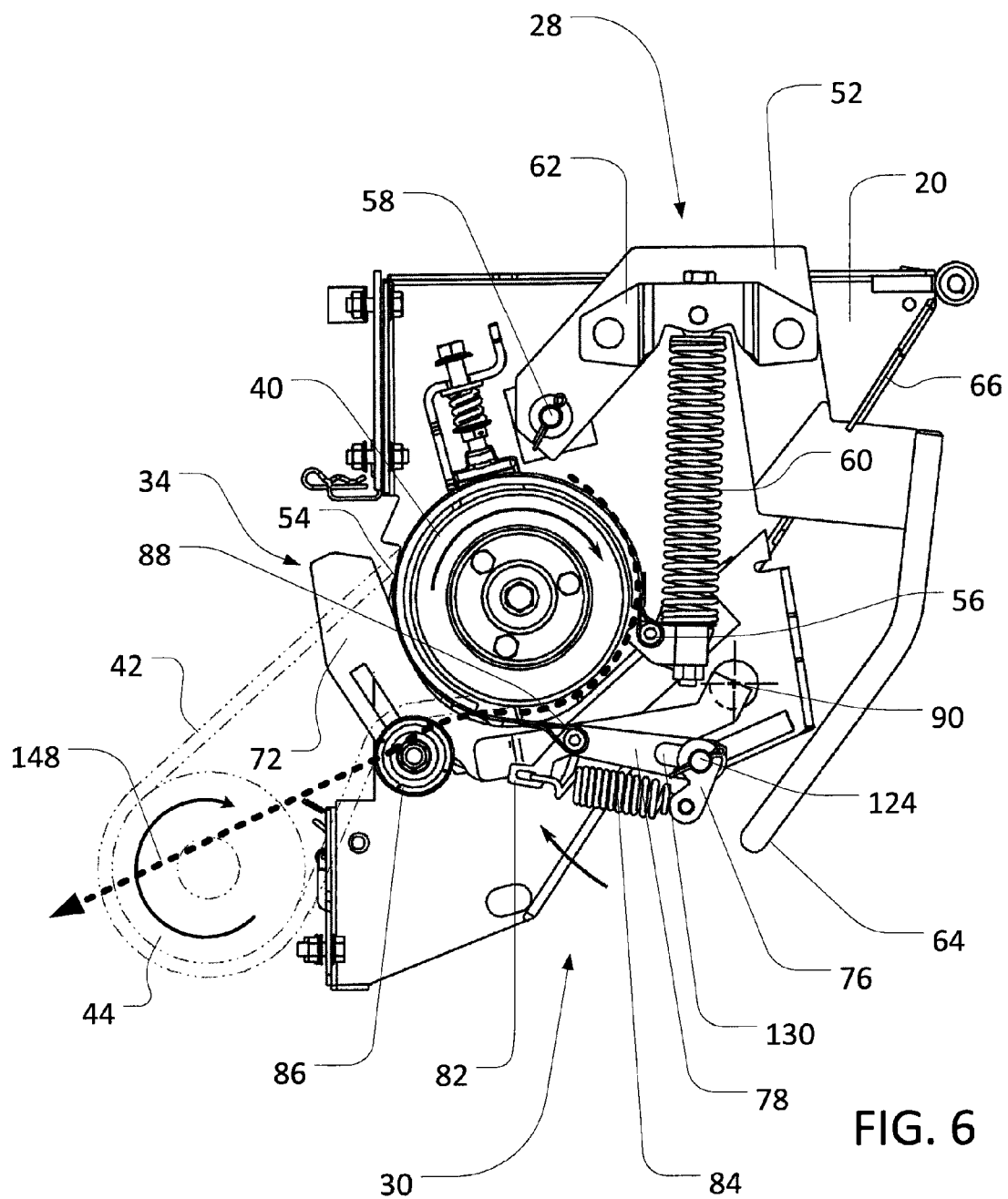
FIGS. 6 and 7 are side views of an example braking operation executed by the assembly of FIG. 3.
Figure 7:
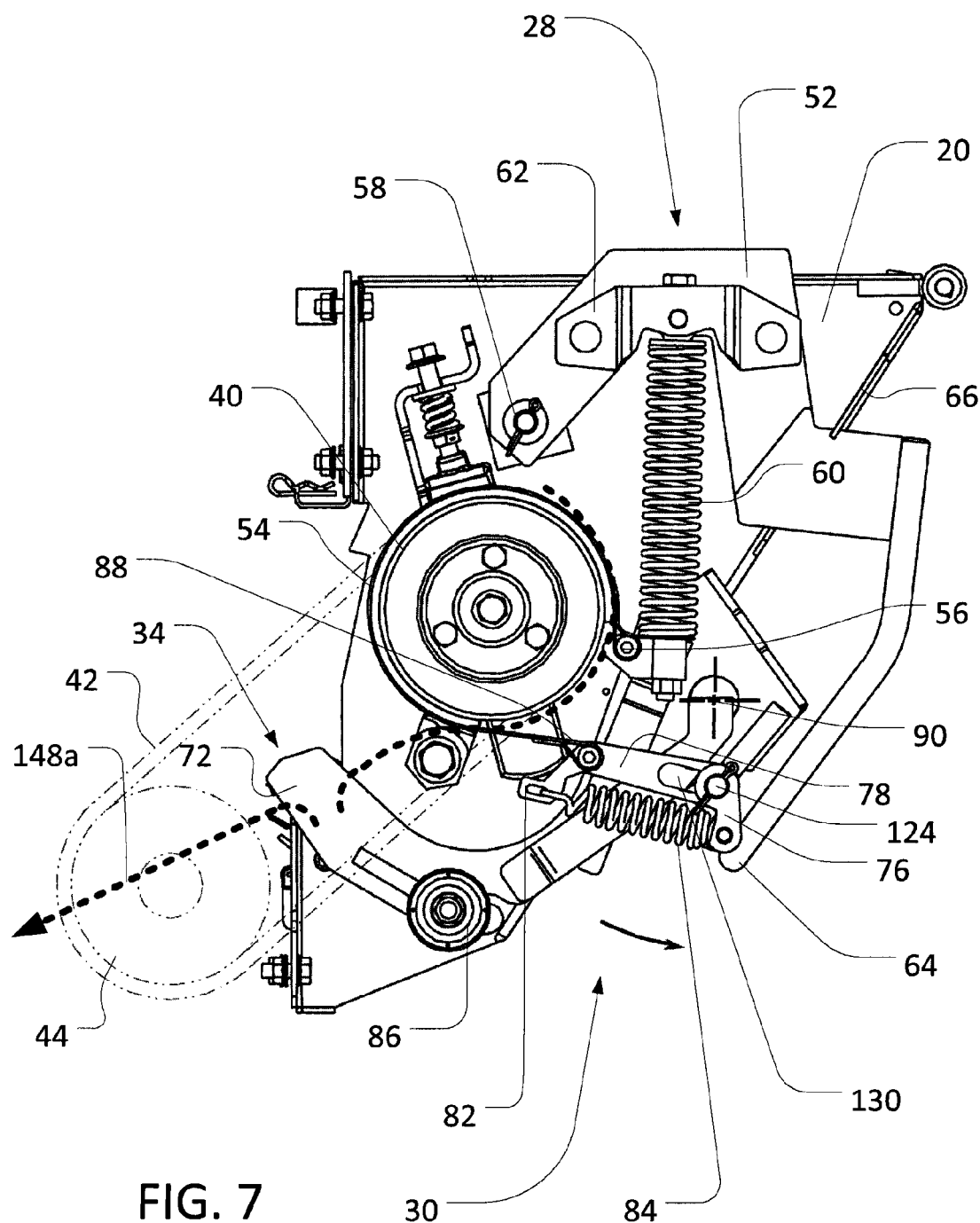

Referring also to FIGS. 6 and 7, an example operation of assemblies 28 and 30 to brake pulley member 40 (and guide roller 32) is depicted, which may assist in braking pulley member 40 (and guide roller 32). In FIG. 6, for example, power source 46 may be providing power to drive pulley 44 and, via drive belt 42, to pulley member 40 and guide roller 32 (not shown in FIGS. 6 and 7). Accordingly, guide roller 32 may rotate material roll 36 (not shown in FIGS. 6 and 7) and guide wrap material (e.g., net wrap) between roll 36 and roller 32 toward baling chamber 18.

As depicted in FIG. 6, counterknife arm 72 may have been generally rotated in a clockwise direction from a reference position to the orientation of FIG. 6, so that idler pulley 86 engages and appropriately tensions drive belt 42 for power transmission, and so that counterknife 34 has been removed from path 148 of the wrap material. This clockwise rotation may have also generally moved the lost-motion linkage (e.g., members 76, 78, and 82 and spring 84) toward release pulley member 40, which may generally result in pin 124 sliding somewhat to the left (from the perspective of FIG. 6) within slot 130 and, correspondingly, to a release of tension from spring 84. In this way, tension on brake belt 54 from tensioning assembly 30 may be released, which may reduce the braking force on pulley member 40 and thereby allow to guide roller 32 to rotate (as driven via drive belt 42).

In certain embodiments, clockwise rotation of counterknife arm 72 to the orientation of FIG. 6 may also correspond with controller 96 (not shown in FIG. 6) causing power source 46 (not shown in FIG. 6) to provide power to drive pulley 44. For example, where power source 46 is an electric motor, controller 96 may cause the motor to activate and provide power to drive pulley 44 when counterknife arm 72 rotates to release brake force from pulley member 40 (i.e., rotates in a clockwise direction to the orientation of FIG. 6). Alternatively (or additionally), controller 96 may cause a clutch device to engage in order to provide power to drive pulley 44, or execute various other power-providing functionality. Such control may be effected in various known ways. For example, appropriate movement of various components within baler 10 may activate a switch, which may provide an electrical (or other) signal to controller 96 and thereby trigger activation (or engagement) of power source 46. Alternatively (or additionally), where controller 96 activates actuation device 92 (e.g., an electric actuator) to pivot counterknife arm 94 (e.g., to move counterknife 34 out of material path 148) (see FIG. 3), controller 96 may also provide an appropriate signal to power source 46 to cause power source 46 to provide rotational power to drive pulley 44.

Continuing, in order to impose a braking force on pulley member 40 (and guide roller 32), tensioning assembly 30 may be rotated in a counterclockwise direction from the orientation depicted in FIG. 6 to the orientation depicted in FIG. 7. This rotation may cause the lost-motion linkage (e.g., members 76, 78, and 82 and spring 84) to move generally away from pulley member 40. This may increase the force on spring 84, elongating spring 84. The elongation of spring 84, in turn, may cause pin 124 to slide to the right (from the perspective of FIG. 7) within slot 130 until it is urged into a stop at the right end of slot 130 and thereby prevents further elongation of spring 84. In this way, and also through the resistance provided by counterforce assembly 28 via brake attachment point 56, tension on brake belt 54 may be increased in order to provide a braking force to pulley member 40 and stop the rotation of guide roller.

Where a spring constant of spring 60 is appropriately large (as compared to a spring constant of spring 84) or where spring 60 has been appropriately pre-compressed, counterforce assembly 28 may provide a resistive force to brake belt 54, in response to tensioning force from tensioning assembly 30, with little to no (further) compression of spring 60. In this regard, it will be understood that a braking operation similar to that described above may also be executed with a solid body (e.g., a solid rod) substituted for spring 60.

As depicted in the various figures, counterclockwise rotation of tensioning assembly 30 (as described above) may also cause counterknife 34 (via the pivoting of counterknife arm 72) to intercept path 148 and thereby sever the wrap material (as depicted in severed path 148a). In this way, for example, once a bale within baling chamber 18 has been appropriately wrapped, a single action (e.g., pivoting counterknife arm 94 with actuation device 92) may simultaneously sever the stream of wrap material and stop guide roller 32 from feeding more wrap material into the wrapping system (e.g., by moving counterknife 34 into path 148 and rotating counterknife 72 to brake pulley member 40).

Various other functionality may additionally (or alternatively) be provided. For example, counterclockwise rotation of counterknife arm 72 to the orientation of FIG. 7 may cause idler pulley 86 to release tension from drive belt 42 and thereby reduce (or eliminate) the ability of drive belt 42 to transfer rotational power from drive pulley 44 to pulley member 40. Similarly, in certain embodiments, the counterclockwise rotation of counterknife arm 72 may correspond with controller 96 causing power source 46 to cease providing power to drive pulley 44. For example, where power source 46 is an electric motor, controller 96 may cause the motor to deactivate and thereby stop providing power to drive pulley 44 when counterknife arm 72 rotates to apply braking force to pulley member 40 Likewise, for example, where power source 46 includes a mechanical connection to PTO connection 14, controller 96 may cause a clutch device to disengage upon counterclockwise rotation of counterknife arm 72.

Such control may be effected in various known ways. For example, appropriate movement of various components within baler 10 may activate a switch, which may provide an electrical (or other) signal to a controller within controller 96 and thereby trigger de-activation (or disengagement) of power source 46. Alternatively (or additionally), where controller 96 activates actuation device 92 (e.g., an electric actuator) to pivot counterknife arm 94 (see FIG. 3), controller 96 may also provide an appropriate signal to power source 46 to cause power source 46 to cease providing rotational power to drive pulley 44. For example, during a wrapping operation, a computing device within controller 96 may count the number of rotations of the bale being wrapped or keep a timer of the wrapping operation. When the appropriate number of rotations have occurred, or an appropriate time has elapsed, the controller may determine that the wrapping operation is complete and may, accordingly, cause actuation device 92 to rotate counterknife arm 94 in a counterclockwise direction (see FIG. 3). Accordingly, and correspondingly, counterknife 34 and counterknife arm 72 may also rotate (e.g., pivot around attachment point 90), causing counterknife 34 to sever the wrap material and assemblies 28 and 30 to brake guide roller 32.

It will be understood that, in certain embodiments, as noted above, counterforce assembly 28 may not be rotatable with respect to frame 20 (e.g., may simply provide a spring-biased anchor at one end of brake belt 54). Likewise, in certain embodiments, counterforce assembly 28 may not include spring 60 or tensioning assembly 30 may not include spring 84. When springs 60 and 84 are both provided, however, it may be useful for spring 60 to be relatively stiffer (i.e., stronger) than spring 84. In this way, as tensioning assembly 30 is rotated into the braking orientation of FIG. 7, spring 60 may not be excessively compressed.

Figure 8:
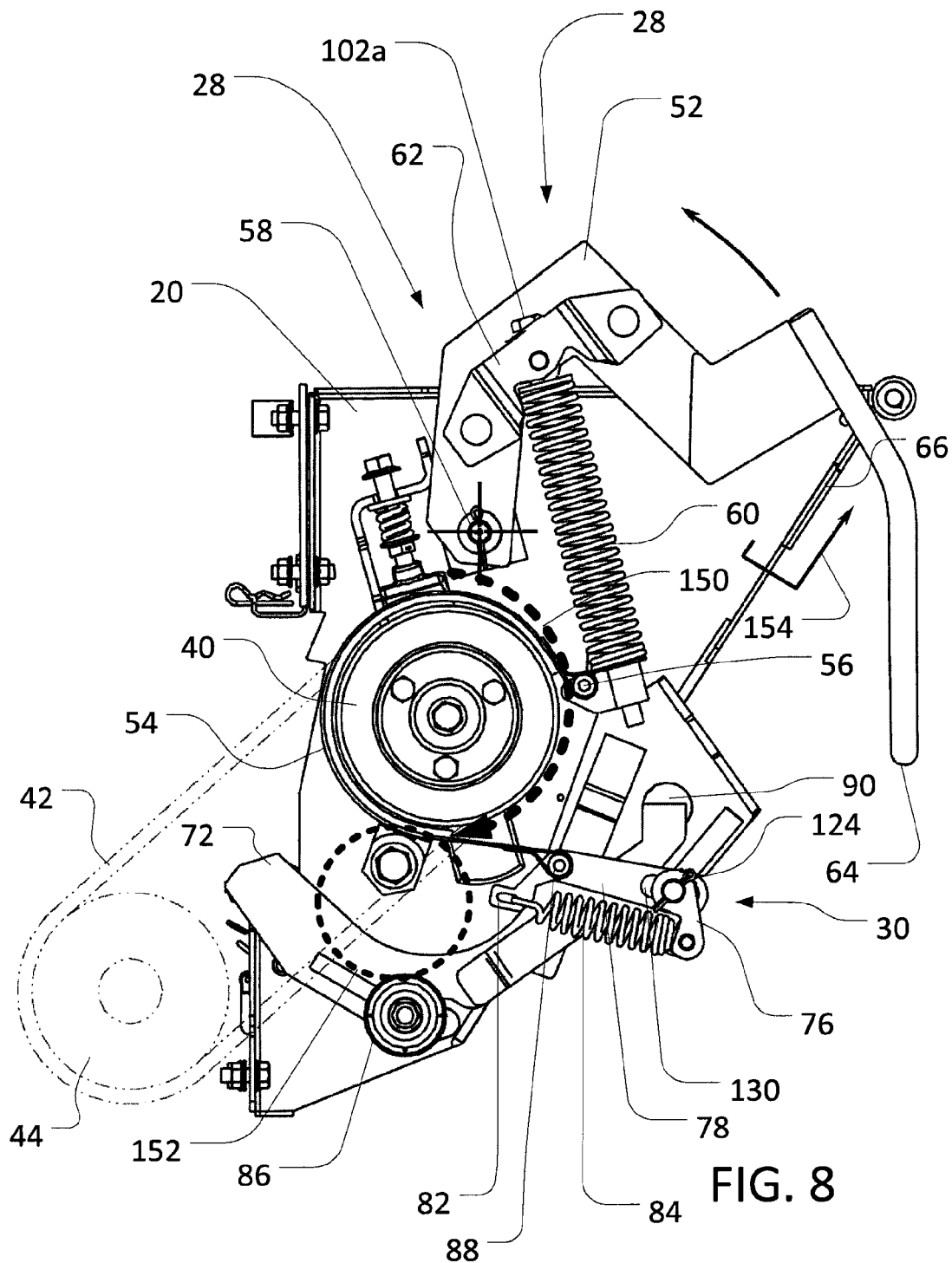
FIGS. 8 and 9 are side views of an example indexing operation executed by the assembly of FIG. 3.
Figure 9:
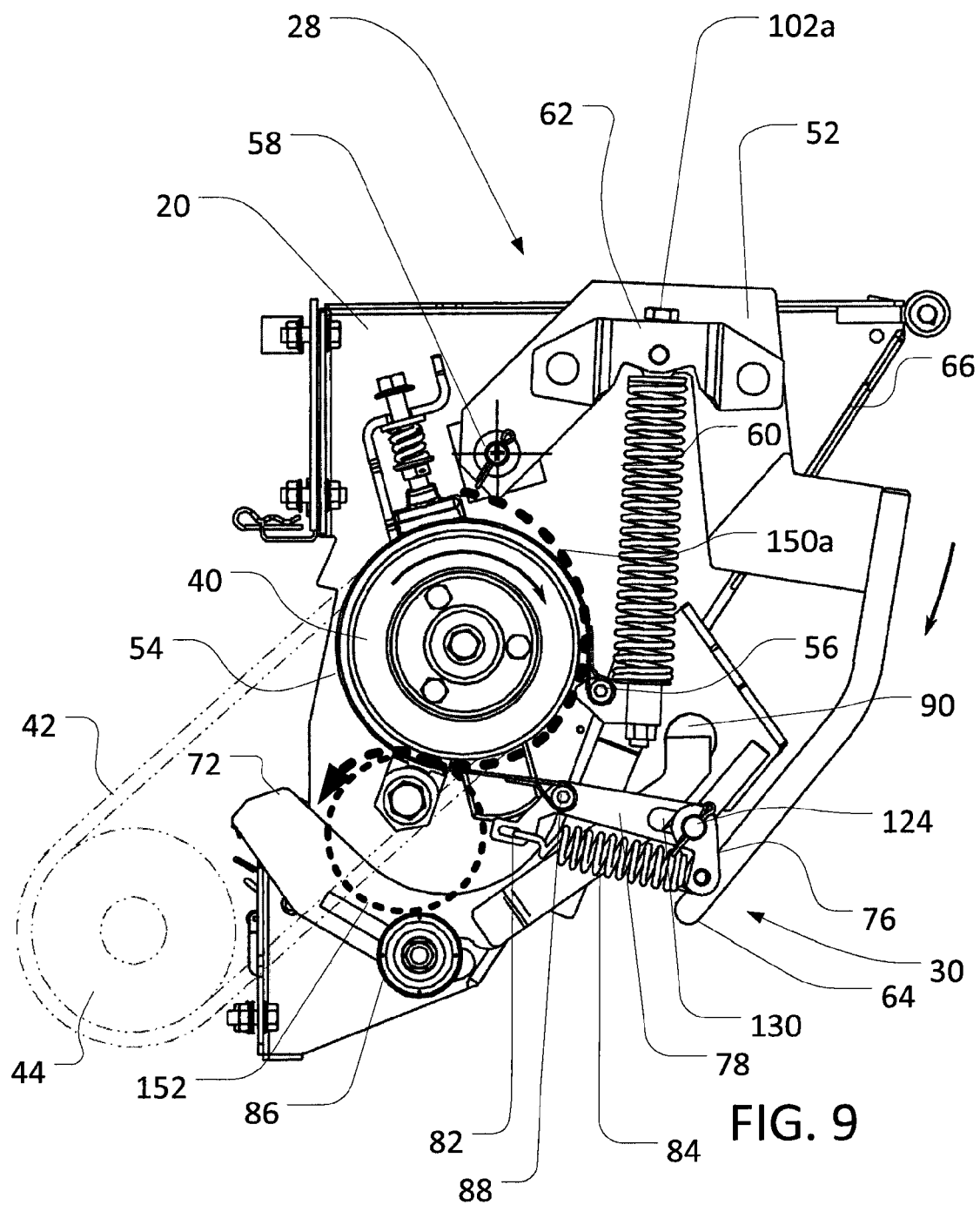

Referring also to FIGS. 8 and 9, an example operation of assemblies 28 and 30 to index pulley member 40 (and guide roller 32) is depicted. In the configuration depicted in FIG. 9, for example, a new material roll (not shown) may have just been loaded into compartment 24 and wrap material from the material roll manually guided along material path 150 to the interface between guide roller 32 and roller 152. Due to the contact (or small clearance) between rollers 32 and 152, however, it may not be practical to guide the material between rollers 32 and 152 without mechanical assistance. Accordingly, the indexing functionality of assembly 30 may be employed (e.g., manually, through user engagement with handle 64) to index roller 32 and thereby feed the wrap material between rollers 32 and 152.

Referring in particular to FIG. 8, feed lever 52 may be released from catch 66 (e.g., by slightly rotating feed lever 52 in a clockwise direction to clear notch 68 (not shown in FIGS. 8 and 9). Where spring 60 is included, this may slightly compress spring 60. Next, feed lever 52 may be flexed (or otherwise moved) away from frame 20 in order to clear catch 66 (and, potentially, to release the slight compression of spring 60). An indexing operation may then be "primed" by rotating feed lever 52 in a counterclockwise direction around attachment point 58, which may generally move attachment point 56 in a counterclockwise with respect to pulley member 40.

Generally, the counterclockwise rotation of feed lever 52 may release tension from brake belt 54 through the counterclockwise movement of attachment point 56. Accordingly, the tensioning force experienced by the tensioning assembly 30 at attachment point 88 may also be decreased. Where spring 84 has been previously elongated beyond its natural length, this decrease in tensioning force may result in a shortening of spring 84 toward the natural length and a corresponding movement of link 78 to the right. Accordingly, as feed lever 52 is rotated in the clockwise direction, pin 124 may be moved to the left within slot 130, away from the stop at the right end of slot 130. The shortening of spring 84 may also draw brake belt 54, via spring-mount member 82, in a counterclockwise direction around pulley member 40.

As also described above, when compressive force from spring 60 is released (e.g., when feed lever 52 is rotated counterclockwise), nut 102a may maintain spring 60 in a particular state of compression. This may usefully ensure that attachment point 58 rotates upward with feed lever 42 in order to release tension on brake belt 54. Further, this may ensure that spring 60 may apply an appropriately large initial tensioning force to brake belt 54 when feed lever 52 is pivoted in the opposite direction.

Continuing, and referring in particular now to FIG. 9, feed lever 52, once primed, may be pivoted around attachment point 58 in a clockwise direction. In certain embodiments, spring 60 may not compress (or may compress only a small amount) as a result of this clockwise pivot of feed lever 52, with spring 60 accordingly acting as (or approximately as) a rigid member to move attachment point 56 clockwise (and downward). (Indeed, in certain embodiments, indexing of pulley member 40 may be achieved with a rigid rod (or other member) in place of spring 60.) This movement of attachment point 56 may apply a tensioning force to brake belt 54 (which, in such a case may be viewed as an indexing device as well as a brake device). This tensioning force may be resisted by tensioning assembly 30 at attachment point 88. In particular, as the clockwise rotation of feed lever 52 pulls on spring 84 (via brake belt 54), spring 84 may resist the tensioning force on brake belt 54 through the elongation of spring 84 from a shorter configuration (see FIG. 8) to an elongated configuration (see FIG. 9). Accordingly, an indexing torque corresponding to the strength of spring 84 may be applied to pulley member 40 by brake belt 54, as feed lever 52 (and attachment point 56) continues its clockwise movement. In this way, for example, pulley member 40 (and guide roller 32) may be indexed in a clockwise direction to feed wrap material along extended path 150a between rolls 32 and 152.

Generally, pin 124 is moved to the right within slot 130, as the clockwise rotation of feed lever 52 causes a leftward movement of link 78, such that spring 84 is elongated.

Further, where the spring constant of spring 60 is larger than the spring constant of spring 84, the length of spring 60 may not substantially change during an indexing operation. As such, during clockwise rotation of feed lever 52, until pin 124 reaches the stop at the right of slot 130 such that no further elongation of spring 84 is possible, the strength of the indexing torque on the pulley member 40 may depend largely on the strength of spring 84 (e.g., on the spring constant of spring 84). Indeed, indexing of pulley member 40 (as described above) may still be possible even if spring 60 is replaced with a rigid rod.

After the clockwise rotation noted above, feed lever 52 may be returned to the orientation depicted in FIG. 8, with spring 84 returning to the shorter configuration. The indexing process (e.g., the progression between the configurations of FIGS. 8 and 9) may then be repeated until an appropriate amount of wrap material has been fed between rolls 32 and 152. Feed lever 52 may then be re-secured in catch 66 (e.g., to allow for the operation and braking of guide roller 32, as described above).

As noted above, with regard to braking operations, in certain embodiments, counterforce assembly 28 may not include spring 60 but may still function for indexing of guide roller 32 (e.g., through similar pivoting of feed lever 52 about frame attachment point 58, but with a rigid connection between feed lever 52 and brake attachment point 56). Likewise, in certain embodiments, certain indexing operations described above may be possible in a configuration in which tensioning assembly 28 includes no spring 84 or in which tensioning assembly 28 is not itself rotatable with respect to frame 20. When springs 60 and 84 are both provided, however, it may be useful for spring 60 to be relatively stiffer (i.e., stronger) than spring 84. In this way, as feed lever 52 is rotated to index guide roller 32 (e.g., moved from the orientation of FIG. 8 to the orientation of FIG. 9), spring 60 may not be excessively compressed and, accordingly, may not excessively absorb the potential indexing force.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A brake assembly for a work machine having a frame and at least one rotating component, the brake assembly comprising:

a wheel attached to and rotating with the at least one rotating component;

a traction device surrounding, at least in part, the wheel;

a tensioning assembly attached to the frame at a frame attachment point of the tensioning assembly, the tensioning assembly including a lost motion linkage limited by a stop to a limited range of motion with respect to the frame, the lost motion linkage being attached to the traction device at a brake attachment point of the tensioning assembly; and a counterforce assembly attached to the traction device at a brake attachment point of the counterforce assembly, and attached to the frame at a frame attachment point of the counterforce assembly;

wherein moving at least a portion of the tensioning assembly in a braking direction with respect to the frame attachment point of the tensioning assembly moves the lost motion linkage toward the stop such that the stop prevents further movement of the lost motion linkage with respect to the frame, the tensioning assembly thereby applying a first tensioning force to the traction device, the first tensioning force being resisted by the counterforce assembly, via the brake attachment point of the counterforce assembly, to impose a braking force on the wheel via the traction device and thereby brake the rotating component; and wherein moving the portion of the tensioning assembly in a release direction with respect to the frame attachment point of the tensioning assembly moves the lost motion linkage away from the stop, the tensioning assembly thereby reducing the first tensioning force to reduce the braking force on the wheel.

2. The brake assembly of claim 1, wherein the counterforce assembly includes:

a mounted member including the frame attachment point of the counterforce assembly; and a spring extending between the mounted member and the brake attachment point of the counterforce assembly;

wherein, when the portion of the tensioning assembly is moved in the braking direction, the spring provides a resistive force to the traction device to resist the first tensioning force from the tensioning assembly.

3. The brake assembly of claim 2, wherein wear on the traction device results in a limited lifespan of the traction device; and wherein the spring is installed on the counterforce assembly in a pre-compressed state, such that the resistive force provided by the spring to the traction device remains substantially constant over the limited lifespan of the traction device.

4. The brake assembly of claim 1, wherein the counterforce assembly includes a feed lever rotatably mounted to the frame at the frame attachment point of the counterforce assembly;

wherein the tensioning assembly includes a first spring attached to the lost motion linkage;

wherein rotating the feed lever in an indexing direction around the frame attachment point of the counterforce assembly applies a second tensioning force to the traction device, the second tensioning force being resisted by the first spring of the tensioning assembly to impose an indexing force on the wheel and thereby index the rotating component; and wherein rotating the feed lever in a reset direction around the frame attachment point of the counterforce assembly releases the second tensioning force to remove the indexing force from the wheel.

5. The brake assembly of claim 4, further comprising:
a catch attached to the frame; and
a second spring extending between the mounted member and the brake attachment point of the counterforce assembly;
wherein, with the counterforce assembly in a braking orientation, the second spring urges the counterforce assembly into the catch, the catch thereby preventing rotation of the feed lever in the reset direction to allow the counterforce assembly to resist the first tensioning force from the tensioning assembly.

6. The brake assembly of claim 1, wherein the tensioning assembly further includes:
a pivoting member rotatably attached to the frame at the frame attachment point;
wherein a lost-motion linkage is attached to the pivoting member, and the lost-motion linkage includes the brake attachment point of the tensioning assembly.

7. The brake assembly of claim 6, wherein the lost motion linkage further includes:
a fixed linkage member having first and second connection components, the fixed linkage member being fixedly attached to the pivoting member;
a movable linkage member with a slot, the slot being engaged by the first connection component of the fixed linkage member; and
a spring-mount member attached to the movable linkage member, the first spring extending between the spring-mount member and the second connection component of the fixed linkage member;
wherein, at least one of the moveable linkage member and the spring-mount member include the brake attachment point attached to the second end of the traction device;
wherein moving the portion of the tensioning assembly in the braking direction urges the first connection component into an end of the slot opposite the brake attachment point, the first connection component and the end of the slot thereby providing the stop to limit the range of motion of the lost motion linkage; and
wherein moving the portion of the tensioning assembly in the release direction moves the first connection component along the slot towards the brake attachment point.

8. The brake assembly of claim 1, further comprising:
a belt-tensioning device attached to the tensioning assembly; and
a drive belt surrounding, at least in part, the wheel;
wherein moving the portion of the tensioning assembly in the release direction moves the belt-tensioning device to tension the drive belt to cause the drive belt to rotate the wheel and the rotating component.

9. The brake assembly of claim 1, further comprising:
a drive member; and
a drive belt surrounding, at least in part, the wheel and the drive member;
wherein moving the portion of the tensioning assembly in the release direction automatically causes a power source to provide drive force to the drive member and thereby to the wheel.

10. The brake assembly of claim 1, further comprising:
a controller determining a state of an operation including the rotating component;
wherein, when the controller determines a first state of the operation, the controller automatically causes an actuation device to move the portion of the tensioning assembly in the braking direction to impose the braking force on the wheel; and
wherein, when the controller determines a second state of the operation, the controller automatically causes the actuation device to move the portion of the tensioning assembly in the release direction to reduce the braking force on the wheel.

11. A baler comprising:
a frame;
a bale-wrapping system including a surface-wrap guide roller;
a counterknife assembly including a support member rotatably mounted to the frame and a counterknife arm mounted to the support member, the counterknife arm pivoting to cause a counterknife to cut surface wrap when the support member rotates with respect to the frame;
a pulley member attached to and rotating with the guide roller;
a traction device surrounding, at least in part, the pulley member;
a tensioning assembly attached to the frame at a frame attachment point of the tensioning assembly, the tensioning assembly including a lost motion linkage limited by a stop to a limited range of motion with respect to the frame, the lost motion linkage being attached to a first end of the traction device at a brake attachment point of the tensioning assembly, and attached to the support member at a pivot point of the tensioning assembly; and
a counterforce assembly attached to a second end of the traction device at a brake attachment point of the counterforce assembly, and pivotably attached to the frame at a frame attachment point of the counterforce assembly;
wherein rotating the support member in a braking direction with respect to the frame causes the tensioning assembly to pivot in the braking direction to move the lost motion linkage toward the stop such that the stop prevents further movement of the lost motion linkage with respect to the frame, the tensioning assembly thereby applying a first tensioning force to the traction device, the first tensioning force being resisted by the first counterforce assembly, via the brake attachment point of the counterforce assembly, to impose a braking force on the pulley member via the traction device and thereby brake the guide roller; and
wherein rotating the support member in a release direction with respect to the frame causes the tensioning assembly to pivot in the release direction to move the lost motion linkage away from the stop, the tensioning assembly thereby reducing the first tensioning force to reduce the braking force on the guide roller.

12. The baler of claim 11, wherein the counterforce assembly includes:
a mounted member; and
a spring extending between the mounted member and the brake attachment point of the counterforce assembly;
wherein, when the tensioning assembly pivots in the braking direction, the spring provides a resistive force to the traction device that opposes the first tensioning force from the tensioning assembly.

13. The baler of claim 11, wherein the counterforce assembly includes a feed lever rotatably mounted to the frame at the frame attachment point of the counterforce assembly;
wherein the tensioning assembly includes a first spring attached to the lost motion linkage;

wherein rotating the feed lever in an indexing direction around the frame attachment point of the counterforce assembly applies a second tensioning force to the traction device, the second tensioning force being resisted by the first spring of the tensioning assembly to impose an indexing force on the pulley member and thereby index the guide roller; and wherein rotating the feed lever in a reset direction around the frame attachment point of the counterforce assembly releases the second tensioning force to remove the indexing force from the pulley member.

14. The baler of claim 13, further comprising:
a catch attached to the frame; and
a second spring extending between the feed lever and the brake attachment point of the counterforce assembly;
wherein, with the counterforce assembly in a braking orientation, the second spring urges the counterforce assembly into the catch, the catch thereby preventing rotation of the counterforce assembly in the reset direction to allow the counterforce assembly to resist the first tensioning force from the tensioning assembly.

15. The baler of claim 11, wherein the tensioning assembly further includes:
a pivoting member fixedly attached to the support member at the pivot point;
wherein the lost-motion linkage is attached to the pivoting member, and the lost-motion linkage includes the brake attachment point of the tensioning assembly.

16. The baler of claim 15, wherein the lost motion linkage further includes:
a fixed linkage member having first and second connection components, the fixed linkage member being fixedly attached to the pivoting member;
a movable linkage member with a slot, the slot being engaged by the first connection component of the fixed linkage member; and
a spring-mount member attached to the movable linkage member, the first spring extending between the spring-mount member and the second connection component of the fixed linkage member;
wherein, at least one of the moveable linkage member and the spring-mount member include the brake attachment point attached to the second end of the traction device;
wherein, when the tensioning assembly pivots in the braking direction, the first connection component is urged into an end of the slot opposite the brake attachment point, the first connection component and the end of the slot thereby providing the stop to limit the range of motion of the lost motion linkage; and
wherein, when the tensioning assembly pivots in the release direction, the first connection component is moved along the slot towards the brake attachment point.

17. The baler of claim 11, further comprising:
a belt-tensioning device attached to the tensioning assembly; and
a drive belt surrounding, at least in part, the pulley member;

wherein rotating the support member in the release direction with respect to the frame causes the tensioning assembly to move the belt-tensioning member to tension the drive belt to cause the drive belt to rotate the pulley member and the guide roller.

18. The baler of claim 11, further comprising:
a drive pulley; and
a drive belt surrounding, at least in part, the pulley member and the drive pulley;
wherein rotating the support member in the release direction automatically causes a power source to provide drive force to the drive pulley and thereby to the pulley member.

19. An indexing assembly for a baler having a frame and a guide roller, the indexing assembly comprising:
a pulley member attached to and rotating with the guide roller;
a traction device surrounding, at least in part, the pulley member;
a feed lever assembly rotatably mounted to the frame at a pivot point, the feed lever assembly being attached to a first end of the traction device at a first attachment point; and
a tensioning assembly attached to the frame, the tensioning assembly including a first spring, and the tensioning assembly being attached to a second end of the traction device at a second attachment point;
wherein rotating the feed lever in an indexing direction around the pivot point applies a first tensioning force to the traction device via the first attachment point, the first tensioning force being resisted by the first spring of the tensioning assembly, via the second attachment point, to impose an indexing force on the pulley member and thereby index the guide roller; and
wherein rotating the feed lever in a reset direction around the pivot point releases the first tensioning force to remove the indexing force from the pulley member.

20. The indexing assembly of claim 19, wherein the tensioning assembly includes a lost motion linkage limited by a stop to a limited range of motion with respect to the frame;
wherein rotating a portion of the tensioning assembly in a braking direction with respect to the frame moves the lost motion linkage toward the stop such that the stop prevents further movement of the lost motion linkage with respect to the frame, the tensioning assembly thereby applying a second tensioning force to the traction device, via the second attachment point, the second tensioning force being resisted by the feed lever, via the first attachment point, to impose a braking force on the pulley member and thereby brake the guide roller; and
wherein rotating the portion of the tensioning assembly in a release direction with respect to the frame moves the lost motion linkage away from the stop, the tensioning assembly thereby reducing the second tensioning force to reduce the braking force on the pulley member.

* * * * *